UNITED STATES PATENT OFFICE.

JOSIAH C. GILMAN, OF MASSENA, NEW YORK.

MEDICAL COMPOUND.

SPECIFICATION forming part of Letters Patent No. 247,818, dated October 4, 1881.

Application filed March 21, 1881. (No specimens.)

*To all whom it may concern:*

Be it known that I, JOSIAH C. GILMAN, a citizen of the United States, residing at Massena, in the county of St. Lawrence and State of New York, have discovered certain new and useful Improvements in Medical Compounds for Rupture Cure; and I do hereby declare the following to be a full, clear, and exact description of the discovery, such as will enable others skilled in the art to which it appertains to make and use the same.

My composition consists of the following ingredients, in the proportions substantially as stated, viz: essential oil of eggs, two hundred and eighty-eight parts; liquid extract of balm of Gilead, one part; to be thoroughly mingled together by agitation.

The preparation of my compound is accomplished in the following manner: The eggs are first boiled hard, and the yolks extracted and ground or mashed to a paste, which is reduced or converted into oil by heat, or in any other suitable manner.

The liquid extract of balm of Gilead is obtained by steeping a quantity of the buds of the plant in a suitable quantity of alcohol. These buds may first be bruised or mashed, in order that they will readily part with their substance and mingle freely with the alcohol. After the substance has been sufficiently extracted the liquid is drained off and mixed with the oil in the proportions stated, and the mixture thus formed is applied as a dressing or lotion to the rupture. The extract of balm of Gilead, in the proportion used, acts as a mild irritant and serves to reinvigorate and open the pores of the skin, while the oil possesses strong healing properties and serves to heal and reunite the ruptured parts, and gradually and speedily effects a permanent cure.

Having thus described my invention, what I claim, and desire to secure by Letters Patent, is—

The herein-described composition of matter, constituting a medical compound for the cure of rupture, consisting of extract of balm of Gilead, alcohol, and the essential oil of eggs, in the proportions specified.

In testimony whereof I affix my signature in presence of two witnesses.

JOSIAH C. GILMAN.

Witnesses:
W. E. PARKER,
W. C. DUVALL.